United States Patent

Chase et al.

[15] 3,668,089

[45] June 6, 1972

[54] TIN OXIDE ETCHING METHOD

[72] Inventors: Eugene W. Chase, West Orange; Harold J. Robinson, South Plainfield, both of N.J.

[73] Assignee: Bell Telephone Laboratories, Incorporated, Murray Hill, N.J.

[22] Filed: Nov. 10, 1969

[21] Appl. No.: 875,258

[52] U.S. Cl. ....................204/143 R, 156/3, 156/4

[51] Int. Cl. ....................B23p 1/00, C23f 1/00

[58] Field of Search....................204/143, 143 R; 156/3

[56] References Cited

UNITED STATES PATENTS 3,205,155 9/1965 Van Natter ....................156/3 X 3,507,759 4/1970 Shaw ....................204/143

3,539,408 11/1970 Cashau et al....................204/143 R

*Primary Examiner*—John H. Mack

*Assistant Examiner*—Neil A. Kaplan

*Attorney*—R. J. Guenther and Edwin B. Cave

[57] ABSTRACT

Tin oxide ($SnO_2$) is etched by forming a layer of a metal such as aluminum on the portions of the $SnO_2$ surface to be etched, and then contacting the metal with an aqueous solution of hydrochloric acid. Passage of a current through the tin oxide-metal composite as cathode while in contact with the solution as electrolyte may be employed to speed up removal of $SnO_2$.

4 Claims, 3 Drawing Figures

INVENTORS E. W. CHASE
H. J. ROBINSON
BY George S. Indig
ATTORNEY

TIN OXIDE ETCHING METHOD

BACKGROUND OF THE INVENTION

1. Field of the Invention

This invention relates to a method for etching tin oxide ($SnO_2$), which method is particularly advantageous for the selective etching of $SnO_2$ films to form predetermined patterns. 25

2. Description of the Prior Art

Tin oxide ($SnO_2$) is generally a difficult material to etch. For example, it is insoluble in most standard acids and bases. One approach has been to contact the surface to be etched with a mixture of powdered zinc and hydrochloric acid. However, this reaction is generally so vigorous and so rapid as to be unsuitable for applications requiring controlled or selective etching, as for example, in the formation of shaped transparent electrodes on electroluminescent materials to produce lighted numeral displays. Where photolithographic techniques are used to define the desired electrode shape, the etchant has been observed to strip away portions of the photoresist coating. In addition, the reaction is so rapid that the treatment often results in incomplete removal of the tin oxide.

Where the tin oxide film is supported by a nonconducting substrate, as in the case of the electroluminescent display mentioned above, electrolytic etching will often result in incomplete removal of the tin oxide, as for example, where uneven rates of attack or uneven film thicknesses result in breaks in the conductive path.

Selective etching has been achieved by arcing a current through an organic dielectric from a movable pen-shaped anode to the tin oxide film as cathode. See U.S. Pat. No. 2,884,313, issued to C. M. Browne, Apr. 28, 1959. However, such a method is obviously unsuitable for mass production, particularly if the desired patterns have a complex geometry or small size.

SUMMARY OF THE INVENTION

Controlled and selective etching of tin oxide ($SnO_2$) is achieved by forming a metallic layer such as aluminum, cadmium or zinc on the portions of the $SnO_2$ surface to be etched, and then contacting the layer with an aqueous solution of hydrochloric acid, so as to result in a chemical reaction in which the tin oxide is converted to a form readily soluble in the acid solution. Any mask used in the formation of the metallic layer may be removed prior to the treatment in the acid solution, since the exposed tin oxide is not attacked by the solution. Passage of an electric current through the tin oxide-metal composite as a cathode while in contact with the solution as electrolyte may be employed to speed up removal of the tin oxide.

DETAILED DESCRIPTION description

Figure 1:
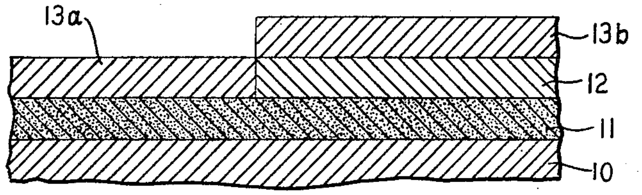
FIG. 1 is a section view of a layered assembly including a tin oxide film upon a support, upon which film have been placed a mask and a metallic layer according to an embodiment of the inventive method.

The surface to be etched may be pure tin oxide or tin oxide together with certain additives or impurities up to 3 weight percent. For example, the conductivity of tin oxide films may be varied within wide limits by adding indium (to decrease conductivity) or antimony (to increase conductivity) in amounts up to 3 weight percent of the final film.

The first step of the inventive method, involving forming a metallic layer on the tin oxide-containing surface, may be preceded if desired by various preliminary steps, such as surface cleaning to promote intimate contact between it and the metallic layer, and masking or otherwise protecting portions of the tin oxide-containing surface which are not to be etched, such as by a preformed removable mask or by photolithographic techniques.

The metallic layer may be a single metal, alloy or compound provided it reacts with a hydrochloric acid solution to produce sufficient hydrogen to reduce the tin oxide to a soluble form. Preferred metals are aluminum, cadmium, and zinc. Such metals permit rapid and substantially complete removal of the tin oxide when contacted with an aqueous solution of hydrochloric acid.

Where metals are chosen which do not result in sufficient hydrogen production for rapid removal of the tin oxide, raising the temperature of the solution or passing current through the tin oxide-metal composite as cathode while in contact with the solution as electrolyte, may be preferred to speed the rate of attack.

The metallic layer should be substantially coherent and may be formed by any method such as vapor deposition, chemical platings, or electroplating, provided however that where electroplating is used, precaution should be taken that the portions of the tin oxide surface which are not to be etched are protected from any attack which might occur due to the electrolytic action of the plating solution.

The thickness of the metallic layer must be such as to provide sufficient reaction to completely remove the tin oxide. A ratio of metal to tin oxide thickness of at least 1 is generally sufficient for substantially complete removal of the tin oxide.

The concentration of the acid in solution may be from 1 percent by volume to saturation, below which the solutions are substantially ineffective in promoting removal of the tin oxide. Concentrations of from 10 to 20 percent by volume are preferred for the promotion of rapid and substantially complete removal. The temperature of solution is not critical, although in general higher temperatures than room temperature up to 100° C may be preferred to speed the reaction for solutions having concentrations in volume percent of 1 to 10.

EXAMPLE

Several samples of tin oxide were prepared by depositing tin oxide films, about 3,000 A thick, on glass or sapphire substrates. On the tin oxide films were vapor-deposited layers of aluminum about 3,000 A thick. These samples were then contacted with hydrochloric acid solutions at various temperatures and concentrations shown in Table 1. Both visual inspection and measurement of percent change in resistance of the conductive tin oxide film before and after etching indicated substantially complete removal of the tin oxide.

TABLE 1

| Conc. of HCl (Percent by Volume) | Temperature Solution (°C) |
|---|---|
| Conc. | ≈25 |
| 50 | ≈25 |
| 5 | 75°C. |
| 1 | 75°C. |

Referring now to the drawing, there is shown in FIG. 1 a section view of an assembly in which a transparent conductive film of tin oxide 11 has been formed on a support 10. Portions of the film 11 which are not desired to be etched are covered with mask 12. Subsequently, deposition of a metallic layer 13 according to the invention forms metallic portions **13*a*, contacting the film 11 and 13*b*, contacting the mask 12**.

Figure 2:
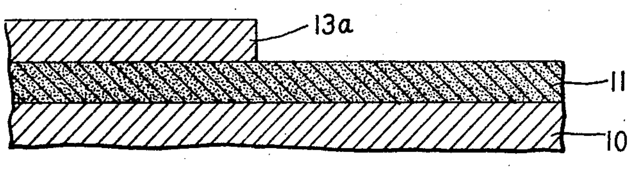
FIG. 2 is a section view of the assembly of FIG. 1 after the mask has been removed.

In FIG. 2, the mask 12 bearing metallic portion **13*b***, has been removed.

Figure 3:
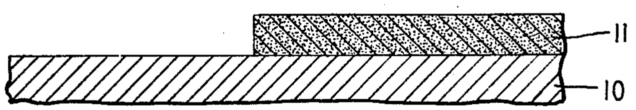
FIG. 3 is a section view of the assembly of FIG. 2 after the metal and a portion of the tin oxide film have been removed according to an embodiment of the inventive method.

In FIG. 3, there is shown the same assembly after contact with an aqueous solution, such as hydrochloric acid solution, according to the invention, which has resulted in removal of the metallic layer 13 and that portion of film 11 contacted by layer 13, leaving a selectively etched film of tin oxide on the support. The support 10 may be any material, and may form an active element of the device, such as an electroluminescent material, as well as a passive support.

The invention has been described in terms of a limited number of embodiments. For example, the masking step may be eliminated, so that the surface of the tin oxide is no longer selectively etched.

What is claimed is:

1. A method for etching at least a portion of a surface comprising tin oxide, said method comprising forming a composite by forming a substantially coherent metallic layer of one or more metals selected from the group consisting of aluminum, cadmium and zinc on the portions of the surface to be etched and contacting the layer with an aqueous solution containing from 1 percent by volume to saturation of hydrochloric acid.

2. The method of claim 1 in which the metallic layer comprises aluminum.

3. The method of claim 2 in which the acid is hydrochloric and is present in an amount from 10 to 20 percent by volume.

4. The method of claim 1 in which current is passed through the composite as a cathode while in contact with the solution as electrolyte.

* * * * *